(12) United States Patent
Zahn et al.

(10) Patent No.: US 8,796,622 B2
(45) Date of Patent: Aug. 5, 2014

(54) THERMAL IMAGING CAMERA COMPRISING A COVER PLATE

(75) Inventors: Patrick Zahn, Buchenbach (DE); Jörg Kaiser, Emmendingen (DE); Martin Stratmann, Freiburg (DE); Karl Schuler, Titisee-Neustadt (DE)

(73) Assignee: Testo AG, Lenzkirch (DE)

( * ) Notice: Subject to any disclaimer, the term of this patent is extended or adjusted under 35 U.S.C. 154(b) by 253 days.

(21) Appl. No.: 12/677,007

(22) PCT Filed: Sep. 2, 2008

(86) PCT No.: PCT/EP2008/007165
§ 371 (c)(1),
(2), (4) Date: Mar. 8, 2010

(87) PCT Pub. No.: WO2009/033594
PCT Pub. Date: Mar. 19, 2009

(65) Prior Publication Data
US 2010/0200751 A1 Aug. 12, 2010

(30) Foreign Application Priority Data
Sep. 6, 2007 (DE) .................. 10 2007 042 310

(51) Int. Cl.
| | |
|---|---|
| *H04N 5/33* | (2006.01) |
| *H01L 31/09* | (2006.01) |
| *H01L 31/02* | (2006.01) |
| *H04N 5/225* | (2006.01) |
| *G01J 5/62* | (2006.01) |
| *G03B 11/04* | (2006.01) |
| *G03B 9/66* | (2006.01) |
| *G03B 9/10* | (2006.01) |
| *H04N 5/232* | (2006.01) |
| *G01J 5/52* | (2006.01) |
| *G01J 5/00* | (2006.01) |

(52) U.S. Cl.
CPC ............... *G03B 9/10* (2013.01); *H04N 5/2251* (2013.01); *G03B 2217/007* (2013.01); *G01J 5/62* (2013.01); *G03B 11/04* (2013.01); *G03B 9/66* (2013.01); *G01J 2005/0081* (2013.01); *H04N 5/33* (2013.01); *H04N 5/232* (2013.01); *G01J 5/522* (2013.01)
USPC ....................................... 250/330

(58) Field of Classification Search
USPC ............ 250/300, 339.04; 396/448, 493, 467, 396/468, 471
See application file for complete search history.

(56) References Cited

U.S. PATENT DOCUMENTS 5,994,701 A * 11/1999 Tsuchimoto et al. ......... 250/351
6,831,380 B2 * 12/2004 Rybnicek et al. ....... 310/40 MM
(Continued)

FOREIGN PATENT DOCUMENTS

DE  1 147 407 B   4/1963
EP  0 020 891 A1  1/1981
(Continued)

*Primary Examiner* — David Porta
*Assistant Examiner* — Edwin Gunberg
(74) *Attorney, Agent, or Firm* — Hoffmann & Baron, LLP

(57) ABSTRACT

This invention relates to a thermal imaging camera comprising a thermal imaging sensor and a cover plate that can be displaced between an open and a closed position by means of an electric drive. The invention is characterized in that the open and the closed position of the cover plate (1) form respectively self-locking end positions and that an electric drive is provided to switch between the end positions, said drive being supplied with no current in the self-locking end positions.

9 Claims, 1 Drawing Sheet

(56) References Cited

U.S. PATENT DOCUMENTS

| | | |
|---|---|---|
| 7,122,788 B1 | 10/2006 | Owen et al. |
| 2004/0263666 A1* | 12/2004 | Tsuji et al. .................... 348/335 |
| 2005/0189825 A1* | 9/2005 | Brodt et al. ..................... 310/32 |
| 2008/0212958 A1* | 9/2008 | Park et al. ..................... 396/448 |

FOREIGN PATENT DOCUMENTS

| | | | | |
|---|---|---|---|---|
| KR | 2003 0067213 A | 8/2003 | | |
| KR | 2003 0092893 A | 12/2003 | | |
| WO | WO 2005/015143 A2 * | 2/2005 | ................ | G01J 5/52 |
| WO | 2007/059453 A2 | 5/2007 | | |
| WO | WO 2008034439 A2 * | 3/2008 | ............. | G03B 19/12 |

* cited by examiner

THERMAL IMAGING CAMERA COMPRISING A COVER PLATE

The invention relates to a thermal imaging camera with a thermal image sensor and a cover plate movable between an open and a closed position by means of an electrical actuator.

In the field of thermal imaging cameras, thermal image sensors based on the bolometer principle are often used. Bolometers with many thousand small individual thermopiles as individual sensors (pixels) can produce precise and finely resolved thermal images.

The cover plate is normally open, except during calibration of the thermal imaging sensor. There is, thus, the risk that the thermal imaging sensor can become contaminated and permanently harmed, particularly when objectives are changed. There is also the risk of overloading the sensor in case it is directed at the sun with the sensor exposed, which can lead to its destruction. In addition, the periodic actuation of the cover plate for the duration of the thermal image sensor calibration requires electric power.

On the other hand, the cover plate can be kept closed, and be opened only during a measurement. Thus, the sensor is indeed protected, but the cover plate must be kept open during the measurement, which can be done either manually or electrically. In the latter case, power is also consumed during the measurement, which shortens the operating time, particularly for battery-operated portable devices.

It is, therefore, the problem of the invention to create an electrically operated cover plate that can be operated in a power-saving manner and, therefore, be used energy-efficiently for thermal imaging sensor calibration and mechanical covering of the sensor.

This problem is solved in that the open position and the closed position of the cover plate each form self-retaining end positions, and in that an electrical actuator that is shut off in the self-retaining end positions is provided for switching between the two end positions.

In the first end position, the sensor is advantageously completely covered and, therefore, protected. In the second end position, the sensor is completely open, i.e., in the measurement position.

The advantage over the known solutions is that the cover plate is self-retaining in both end positions and, thus, the cover plate can remain in the two end positions without continuously using energy. A current pulse is necessary only to change between the two end positions, but requires only a minimal expenditure of energy overall. Thus, the operating time can be considerably extended for battery-operated portable devices, which can be crucial, particularly in field use with mobile thermal imaging cameras.

It is particularly advantageous if the cover plate has a bistable tilting element that can be shifted by an electrical actuator. For this purpose, the cover plate can be connected to a pivot arm, at the end of which a pivot bearing is provided and is engaged with a pivot actuator. Offset from the rotational axis, an engagement position is provided for a spring as the tilting element that fixes the two end positions.

It is additionally advantageous if the cover plate comprises a temperature sensor, in particular, a thermocouple. The temperature of the cover plate can thereby be exactly determined, and calibration of the thermal imaging sensor is more precise, relative to a pure measurement of the housing temperature.

Additional advantageous configurations follow from the subordinate claims, as well as from combinations of the individual characteristics.

An embodiment of the invention will be explained below based on the drawings.

Therein:

Figure 1:
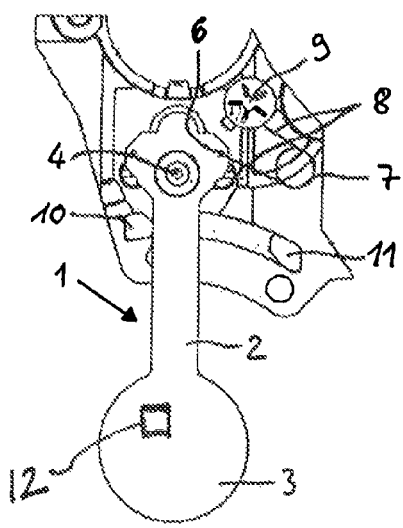
FIG. 1 shows a front view onto a cover plate in one end position.
Figure 2:
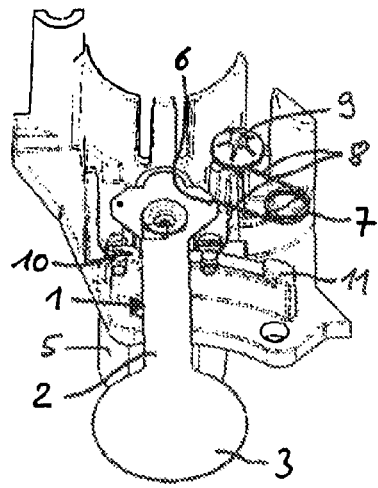
FIG. 2 shows a perspective oblique view of the cover plate from FIG. 1.
Figure 3:
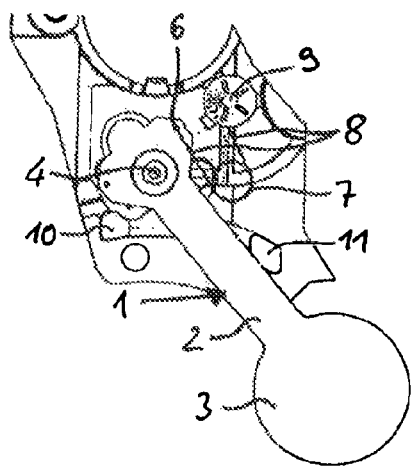
FIG. 3 shows a front view onto a cover plate in a second end position.
Figure 4:
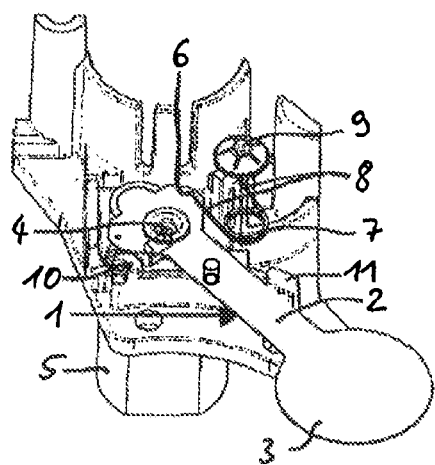
FIG. 4 shows a perspective oblique view of the cover plate from FIG. 3.

FIGS. 1 and 2 show a cover plate 1 of a thermal imaging camera in the closed end position, in which a thermal imaging sensor belonging to the thermal imaging camera is covered. Cover plate 1 has a pivot arm 2 having a cover disk 3 at one end and a mount 4 at the other end in the form of a pivot bearing at which pivot arm 2 is connected to an electric motor 5 (for example, a stepper motor, geared motor, or the like). At the side and offset from the axis of rotation pivot arm 2, there is a suspension point 6 for a spring 7, which is constructed as a leg spring 7 and has two legs 8, one of which is fixed to pivot arm mounting point 6 and the other of which is fixed to a stationary mounting point 9 on the housing. Legs 8 are each movably seated in mounting points 6, 9. Spring 7 is therefore relaxed in both end positions and holds in the cover plate against a stop 10 (FIGS. 1 and 2) or a stop 11 (FIGS. 3 and 4). The cover plate 1 may comprise a temperature sensor 12.

By means of the rotation of motor 5, pivot arm 2 is pivoted, and spring 7 is initially tensioned because legs 6 and 9 are pressed together. As soon as the dead point has been passed, spring 7 relaxes. The cover plate is, therefore, held in the second end position, and pivot arm 2 rests against second stop 11, as can be seen in FIGS. 3 and 4. To tilt the cover plate back again, the polarity is reversed at motor 5, and pivot spring 7 is pressed together again until the dead point is overcome and the cover plate has again tilted back into the first end position. Motor 5 is powered only during the short switching phases, while it is turned off in the two end positions of cover plate 3.

Since motor 5 need not meet any requirements with respect to its retaining force in the end positions, an inexpensive electric motor can be used here. In addition, because a complete revolution is not needed to tilt the cover plate, any other actuator can also be used that is capable of overcoming the dead point of the pivot arm, such as a solenoid, a voice coil actuator or the like. Thus, the actuator can be manufactured economically, and the cover plate is also manually operable if necessary.

The invention claimed is:

1. Infrared camera with a thermal imaging sensor and a planar cover plate adjustable between an open and a closed position by means of an electric drive (5), the cover plate comprising a temperature sensor, wherein the open position and the closed position of the cover plate (1) each form a self-locking end position, wherein, for changing between the two end positions, an electric drive (5) is provided that is switched to be deactivated in the self-locking end positions, wherein the cover plate (1) includes a cover disk (3) connected to a first end of a pivot arm (2) on whose second end a pivot bearing (4) is provided and on which the electric drive (5) attaches, a contact point (6) is provided on the pivot arm (2) at the second end thereof offset to the rotational axis of the pivot bearing (4), a leg spring (7) having two legs of which one is movably seated in a mounting point on the contact point (6) and the other is movably seated in a mounting point on a fixed suspension point (9) on the housing, wherein, as a tipping element, the leg spring (7) fixes the two end positions.

2. Infrared camera according to claim 1, characterized in that the leg spring (7) is a bistable tipping element that can be switched over by the electric drive.

3. Infrared camera according to claim 1, characterized in that the leg spring (7) is freed from stress in both of the end positions.

4. Infrared camera according to claim 1, characterized in that the electric drive (5) has a coil and a permanent magnet.

5. Infrared camera according to claim 1, characterized in that the electric drive has an electric motor.

6. Infrared camera according to claim 1, characterized in that the temperature sensor is a thermocouple.

7. Infrared camera according to claim 5, characterized in that the electric motor is a stepper motor.

8. Infrared camera according to claim 5, characterized in that the electric motor is a geared motor.

9. Infrared camera according to claim 1, characterized in that the pivot arm is elongated with a longitudinal axis coincident with the rotational axis of the pivot bearing, the leg spring continuously being on one side of the longitudinal axis in fixing the two end positions.

\* \* \* \* \*